(No Model.)

J. H. HUNTER.
FISH HOOK.

No. 385,913. Patented July 10, 1888.

Witnesses,
N. S. Roberts
M. D. Murphy

Inventor,
Joseph H. Hunter
L. S. Bacon
Attorney.

UNITED STATES PATENT OFFICE.

JOSEPH H. HUNTER, OF WASHINGTON, DISTRICT OF COLUMBIA.

FISH-HOOK.

SPECIFICATION forming part of Letters Patent No. 385,913, dated July 10, 1888.

Application filed May 10, 1888. Serial No. 273,444. (No model.)

*To all whom it may concern:*

Be it known that I, JOSEPH H. HUNTER, a citizen of the United States, residing at Washington, in the District of Columbia, have invented certain new and useful Improvements in Fish-Hooks; and I do hereby declare the following to be a full, clear, and exact description of the invention, such as will enable others skilled in the art to which it appertains to make and use the same.

My invention relates to an improvement in fish-hooks; and it consists in the construction and arrangement of parts, more fully hereinafter described, and definitely pointed out in the claims.

The object of my invention is to provide a fish-hook which will at all times retain the bait in its proper adjusted position relative to the point by preventing the same from working up the shank and onto the line, thereby rendering it useless as a bait. I attain this object by the construction of hook illustrated in the accompanying drawings, wherein like letters of reference indicate corresponding parts in the several views, and in which—

Figure 1:
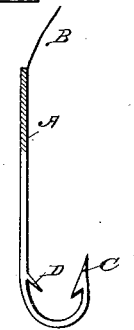

Figure 1 is a side elevation of one of my improved hooks, and Figs. 2, 3, 4, and 5 are modifications of the same.

In the drawings, A represents the shank of a hook of ordinary and well-known form; B, the line attached to its end, and C the point, provided with the usual barb. Secured to the shank in any suitable manner at a point on a plane with the point C is a prong or projection, D, extending out for a short distance between the point C and the shank, and preferably inclined downward toward the curve of the hook. This projection D is made of sufficient length to act as an obstruction to the upward movement of the bait on the shank, and, owing to its location, retains the same in proximity to the point C. Its length, however, in general is not sufficient to interfere with the action of the hook by preventing the jaw of the fish from coming in contact with the point, and by inclining the projection downward the danger of such an occurrence is wholly overcome. This projection further adds to the efficiency of the hook by permitting its sliding or longitudinal movement in the incision when the fish is hooked.

Figure 2:
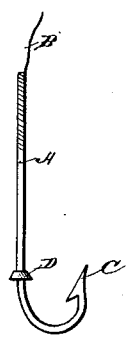

In Fig. 2 is shown a modified form of projection, it consisting of a collar having projecting lower edges extending out on all sides thereof, its lower face being preferably flat. This collar is made fast at the desired point in any suitable manner, or may be made integral with the hook.

Figure 3:
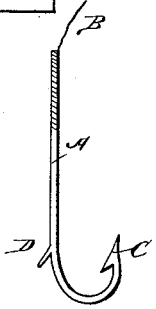

In Fig. 3 the prong is placed on the outside of the hook and inclined downward to offer no resistance to weeds and other obstacles. This form is more especially adapted for small hooks.

Figure 4:
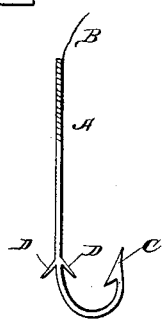

In Fig. 4 the prongs are represented as extending out from all sides of the hook and inclining downwardly.

Figure 5:
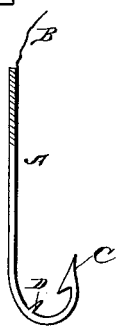

In Fig. 5 I have shown the projection located at a point below the point C on the curved portion of the hook, to decrease the limit of movement of the bait.

It is evident that the projection may be placed at any desired point between the attaching end of the shank and the point; but the position shown in Fig. 1 is generally preferred.

I am aware that many minor changes in the construction and arrangement of the parts of my invention can be made and substituted for those shown and described without departing in the least from the nature and principle of my invention.

What I claim as new, and desire to secure by Letters Patent, is—

1. A fish-hook having one or more short rigidly-secured inclined projections thereon for retaining the bait in its adjusted position relative to the point of the hook, substantially as described.

2. A fish-hook having one or more outwardly-projecting prongs rigidly secured to the shank thereof at a point on a plane with the point of the hook, substantially as described.

3. A fish-hook having a short downwardly-inclined projection thereon at a point in proximity to the point of the hook, for the purposes specified, substantially as described.

4. A fish-hook having a short rigid projection thereon in proximity to the point of the hook for preventing the bait from working up the shank of the hook, substantially as described.

In testimony whereof I affix my signature in presence of two witnesses.

JOSEPH H. HUNTER.

Witnesses:
FRANK T. HUNTER,
ROBT. MASON.